United States Patent
Liu

(10) Patent No.: US 12,057,931 B2
(45) Date of Patent: Aug. 6, 2024

(54) DATA TRANSMISSION METHOD AND APPARATUS, TERMINAL DEVICE, AND STORAGE MEDIUM

(71) Applicant: ZTE CORPORATION, Guangdong (CN)

(72) Inventor: Feng Liu, Guangdong (CN)

(73) Assignee: ZTE CORPORATION, Guangdong (CN)

(*) Notice: Subject to any disclaimer, the term of this patent is extended or adjusted under 35 U.S.C. 154(b) by 149 days.

(21) Appl. No.: 17/770,024

(22) PCT Filed: Aug. 6, 2020

(86) PCT No.: PCT/CN2020/107288
§ 371 (c)(1),
(2) Date: Apr. 18, 2022

(87) PCT Pub. No.: WO2021/103640
PCT Pub. Date: Jun. 3, 2021

(65) Prior Publication Data
US 2022/0393787 A1    Dec. 8, 2022

(30) Foreign Application Priority Data

Nov. 28, 2019   (CN) .......................... 201911190838.0

(51) Int. Cl.
*H04L 1/00* (2006.01)
*H04J 3/16* (2006.01)

(52) U.S. Cl.
CPC .......... *H04L 1/0002* (2013.01); *H04J 3/1652* (2013.01); *H04L 1/0057* (2013.01)

(58) Field of Classification Search
CPC .............................. H04L 1/0002; H04J 3/1652
USPC ............................................................. 398/98
See application file for complete search history.

(56) References Cited

U.S. PATENT DOCUMENTS

| 2010/0021173 A1 | 1/2010 | Zhang et al. |
| 2010/0209107 A1 | 8/2010 | Yin |
| 2019/0034646 A1* | 1/2019 | Fujiwara ............. H04L 63/0428 |

(Continued)

FOREIGN PATENT DOCUMENTS

| CN | 101695144 B | 8/2015 |
| CN | 108632886 A | 10/2018 |
| CN | 108809901 A | 11/2018 |

(Continued)

OTHER PUBLICATIONS

WIPO, International Search Report issued on Oct. 15, 2020.
(Continued)

*Primary Examiner* — Ted M Wang
(74) *Attorney, Agent, or Firm* — Li & Cai Intellectual Property (USA) Office

(57) ABSTRACT

Disclosed are a data transmission method and apparatus, a terminal device, and a storage medium. The data transmission method includes: determining a basic unit carrying client data, wherein a rate of the client data is less than a set value determined according to a rate of a carrying container of an optical transport network (OTN) frame, and the basic unit is a basic unit contained in a basic unit set; mapping the client data to the basic unit; and sending, through the OTN frame, the basic unit set to which the client data is mapped.

18 Claims, 11 Drawing Sheets

(56) References Cited

U.S. PATENT DOCUMENTS

2020/0014480 A1  1/2020  Xiang et al.
2021/0058156 A1* 2/2021  Su ...................... H04L 47/6275

FOREIGN PATENT DOCUMENTS

| CN | 109981209 A | 7/2019 |
| CN | 110266612 A | 9/2019 |
| CN | 111092686 A | 5/2020 |
| WO | WO 2019213901 A1 | 11/2019 |

OTHER PUBLICATIONS

European Patent Office, the Extended European Search Report dated Feb. 28, 2024, for corresponding EP application No. 20891471.3.

* cited by examiner

DATA TRANSMISSION METHOD AND APPARATUS, TERMINAL DEVICE, AND STORAGE MEDIUM

The present application claims priority to the Chinese patent application No. 201911190838.0 filed with the China Patent Office on Nov. 28, 2019, the entire contents of which are incorporated in the present application by reference.

TECHNICAL FIELD

The present application relates to the field of communications, and for example, relates to a data transmission method and apparatus, a terminal device, and a storage medium.

BACKGROUND

A communication network backbone layer uses an optical transport network (OTN) technology to carry client services, and defines containers with various rates from 1.25 G to 40 G to carry clients of corresponding rates. In the penetration of the OTN technology from a backbone layer to an access layer, a problem with carrying efficiency is encountered. The original OTN-defined carrying containers, with several rates such as 1.25 G, 2.5 G, 10 G, 40 G, or the like, are suitable for clients with a rate higher than 1.25 G. For various client services including low-rate data, such as a rate less than 1.25 G, when low-latency and high-quality transmission is needed, one client service may be delivered on one 1.25 G container to guarantee the transmission quality, which, however, has a very low transmission efficiency and leads to serious bandwidth waste.

SUMMARY

The present application provides a data transmission method and apparatus, a terminal device, and a storage medium.

An embodiment of the present application provides a data transmission method, including: determining a basic unit carrying client data, wherein a rate of the client data is less than a set value determined according to a rate of a carrying container of an optical transport network (OTN) frame, and the basic unit is a basic unit contained in a basic unit set; mapping the client data to the basic unit; and sending, through the OTN frame, the basic unit set to which the client data is mapped.

An embodiment of the present application further provides a data transmission method, including: receiving an optical transport network (OTN) frame; recovering a basic unit set from the OTN frame; and extracting client data from the basic unit set, wherein the basic unit set includes a basic unit carrying the client data, and a rate of the client data is less than a set value determined according to a rate of a carrying container of the OTN frame.

An embodiment of the present application further provides a data transmission apparatus, including: a determining module configured to determine a basic unit carrying client data, wherein a rate of the client data is less than a set value determined according to a rate of a carrying container of an optical transport network (OTN) frame, and the basic unit is a basic unit contained in a basic unit set; a mapping module configured to map the client data to the basic unit; and a transmitting module configured to send, through the OTN frame, the basic unit set to which the client data is mapped.

An embodiment of the present application further provides a data transmission apparatus, including: a receiving module configured to receive an optical transport network (OTN) frame; a recovery module configured to recover a basic unit set from the OTN frame; and an extraction module configured to extract client data from the basic unit set, wherein the basic unit set includes a basic unit carrying the client data, and a rate of the client data is less than a set value determined according to a rate of a carrying container of the OTN frame.

An embodiment of the present application further provides a terminal device, including: one or more processors; a storage configured to store one or more programs; wherein the one or more programs, when executed by the one or more processors, cause the one or more processors to implement the data transmission method according to any embodiment of the present application.

An embodiment of the present application further provides a storage medium having a computer program stored thereon which, when executed by a processor, causes the processor to implement the data transmission method according to any embodiment of the present application.

DETAIL DESCRIPTION OF EMBODIMENTS

Embodiments of the present application will be described below with reference to the accompanying drawings.

The operations illustrated in the flowchart of the drawings may be executed in a computer system such as a set of computer-executable instructions. Also, although a logical order is shown in the flowchart, in some cases, the operations shown or described may be performed in a different order than illustrated herein.

Figure 1:
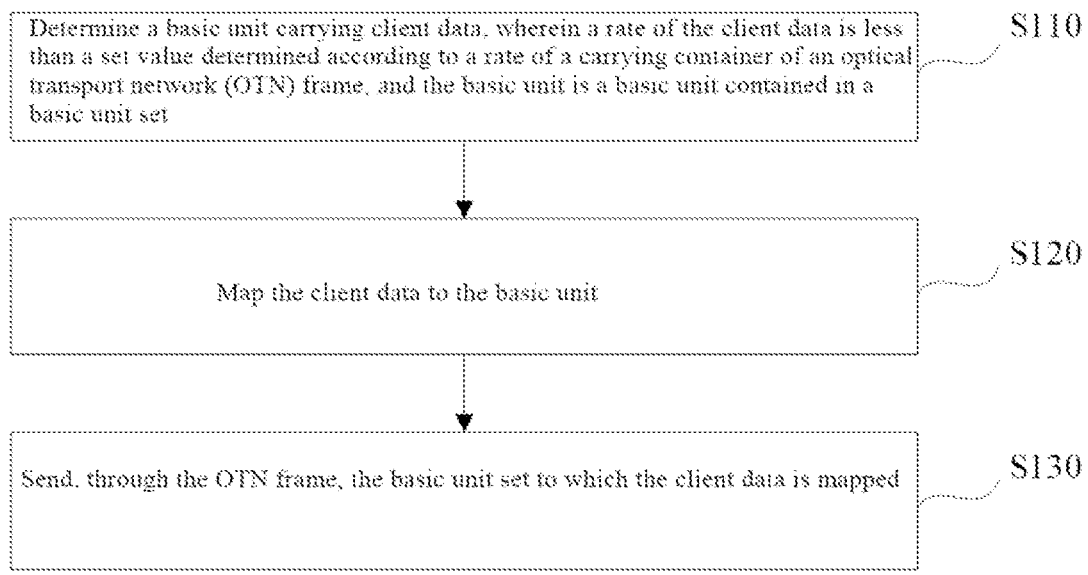
FIG. 1 is a schematic flowchart of a data transmission method provided in the present application.

In an exemplary implementation, FIG. 1 is a schematic flowchart of a data transmission method provided in the present application. The method may be suitable for improving the transmission efficiency of client data with a rate less than a set value, and may be executed by the data transmission apparatus of the present application. The apparatus may be implemented by software and/or hardware, and integrated on a terminal device. The terminal device may encompass any suitable type of user equipment. The terminal device may be a device configured to transmit client data.

The communication network backbone layer uses an OTN technology to carry client services, and defines client carrying modes with various rates from 1.25 G to 40 G. In the penetration of the OTN technology from a backbone layer to an access layer, a problem with carrying efficiency is encountered. The original OTN-defined carrying containers, with several rates such as 1.25 G, 2.5 G, 10 G, 40 G, or the like, are suitable for clients with a rate higher than 1.25 G. For many low-rate clients at the access layer, such as clients of 2 M, 10 M, 100 M, a serious bandwidth waste problem will occur if a 1.25 G container is used for carrying. For low-rate services with a rate less than 1.25 G (collectively referred to as fine-grained services or fine-grained client services or client data, i.e., various client services with a rate less than 1.25 G, such as 1 G, 100 M, 10 M, 2 M, etc.), the present application provides a high-quality and high-efficiency delivery method for low-rate fine-grained client services based on an OTN protocol.

Figure 1A:
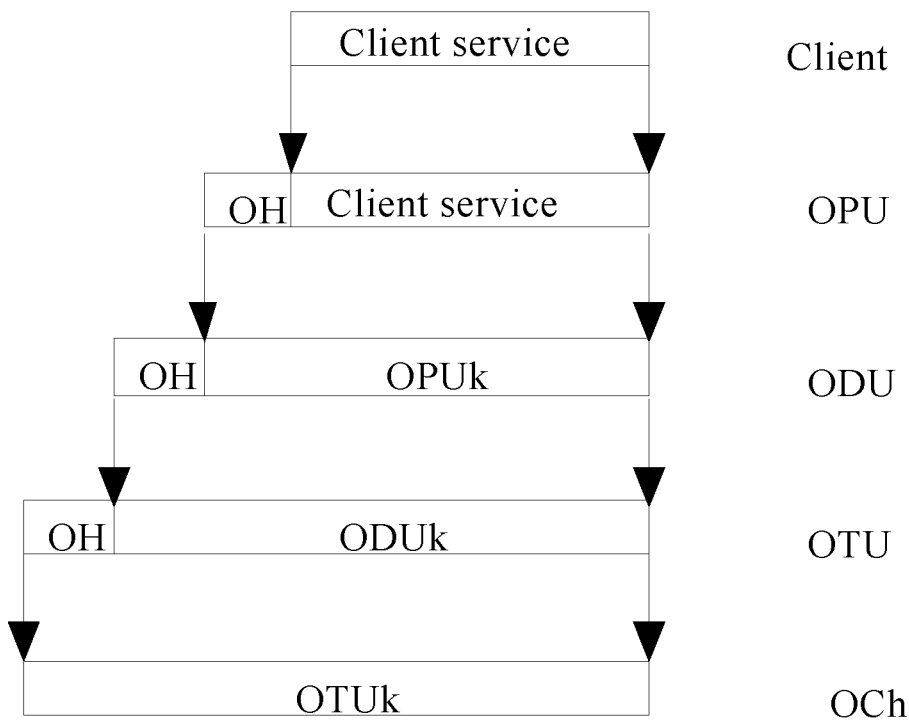
FIG. 1a is a schematic diagram showing a process of carrying a client service by means of the OTN technology provided in the present application.

FIG. 1*a* is a schematic diagram showing a process of carrying a client service by means of the OTN technology provided in the present application. As shown in FIG. 1*a*, an optical channel payload unit (OPU) serves as a client carrying unit, which consists of a client container part and an OPU overhead part, and client services are directly mapped into the OPU container for carrying and delivery. An optical channel data unit (ODU) consists of an ODU container part and an ODU overhead part, and the OPU is directly mapped into the ODU container. An optical channel transport unit (OTU) consists of an OTU container part and an OTU overhead part. The ODU is directly mapped into the OTU container. A frame positioning field is added to the OTU to form an OTU frame for delivery via an optical fiber, and to be connected to the remainder terminal devices via optical connection (OC).

Figure 1B:
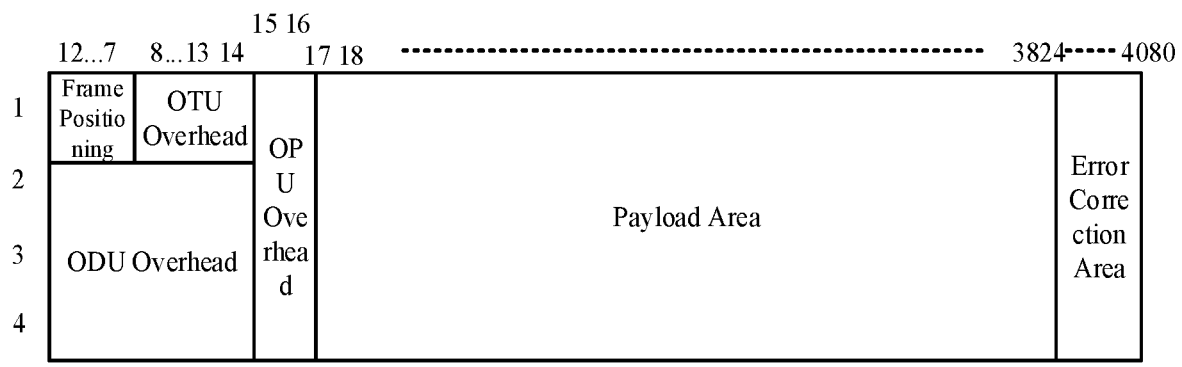
FIG. 1b is a schematic diagram of an OTN frame structure provided in the present application.

FIG. 1*b* is a schematic diagram of an OTN frame structure provided in the present application. Referring to FIG. 1*b*, the frame structure is a frame structure formed after a client service has been subjected to multiple layers of mapping through an OPU, an ODU, and an OTU. In order to increase a transmission distance of the OTN frame, a forward error correction (FEC) field is added behind the frame structure, that is, the FEC field is added in an error correction area. When a small amount of errors are encountered during the delivery process of the OTN frame in the optical fiber, the error correction field may be used for error detection and correction, so as to improve the information delivery quality and increase the transmission distance. The OTN frame structure consists of 4 rows and 4080 columns, where the first 17 columns are OPU, ODU, and OTU overhead fields, the last 256 columns are error correction fields, and the middle fields form a client payload carrying area, i.e., a payload area. In this embodiment, k represents different levels of rates, and when k=0, the OPU container has a carrying rate of 1.25 G, when k=1, the OPU container has a carrying rate of 2.5 G, so on and so forth, which respectively represent carrying container rates of 10 G and 40 G.

As shown in FIG. 1, a data transmission method provided by the present application includes S110, S120, and S130.

S110 includes determining a basic unit carrying client data, where a rate of the client data is less than a set value determined according to a rate of a carrying container of an optical transport network (OTN) frame, and the basic unit is a basic unit contained in a basic unit set.

The client data may be considered as data to be sent, and the client data may be carried in a basic unit set and then sent to another terminal device such as a terminal device in communication with the current terminal device, through the OTN frame, where the communication content includes the client data.

The client data of the present application may be carried on part of the basic units in the basic unit set, and the client data of one terminal device may be mapped onto part of the basic units in the basic unit set so that the basic unit set can carry the client data of at least one terminal device, and thus the basic unit set can carry the client data of multiple terminal devices, which improves the delivery efficiency.

In the case of sending client data, a basic unit carrying client data in a basic unit set may be firstly determined in the present application. The basic unit set may include n basic units, where n is a positive integer. In the present application, the basic unit carrying the client data of the current terminal device may include the basic units numbered 1, 6, 11, 16 . . . or may include the basic units from 1 to m, where m is a positive integer less than n. That is, the basic unit carrying the client data may include at least two basic units spaced apart from each other, or at least two consecutive basic units in the basic unit set, or may be one basic unit in the basic unit set.

The determining the basic unit in this operation may be understood as determining a format and a number (i.e., a sequence number) of the basic unit. Different basic units may have different formats. For example, in the case that the basic unit is a cell, the basic unit may be in the format of 66-bit code blocks or bytes. The format of the basic unit is not limited herein. After determining the format of the basic unit, the present application may determine a sequence number of the basic unit. Each basic unit in the basic unit set may be numbered with a sequence number. This operation may determine the sequence number of the basic unit carrying the client data.

The present application does not limit which basic unit(s) is(are) used for carrying the client data, as long as the basic unit(s) is(are) predetermined by the two communication parties, so as to avoid mapping the client data of different terminal devices to the same basic unit.

In the present application, a rate of the client data is less than a set value which may be determined according to a rate of a carrying container of the OTN frame. For example, the set value is the rate of the carrying container of the OTN frame, the rate of the client data in the present application is less than the rate of the carrying container of the OTN frame. For example, in the case that the carrying container of the OTN frame has a rate of 1.25 G, the client data described in the present application is data with a rate less than 1.25 G, which may also be referred to as "fine-grained client service".

In an embodiment, the number of basic units carrying client data in the present application may be determined based on a bandwidth required by the client data and a carrying bandwidth of a single basic unit. The bandwidth of a single basic unit may be determined based on the rate of the carrying container of the OTN frame and a cycle period of the basic unit. For example, the rate of the carrying container of the OTN frame is divided by the cycle period of the basic unit to obtain the bandwidth of the single basic unit. The cycle period may be considered as the number of basic units contained in the basic unit set.

S120 includes mapping the client data to the basic unit.

After the basic unit is determined, the client data in the present application may be mapped onto the basic unit, that is, the basic unit set carries the client data.

S130 includes sending, through the OTN frame, the basic unit set to which the client data is mapped.

When mapping of the client data is completed, the basic unit set may be carried on the OTN frame for transmission in this operation.

In the data transmission method provided in the present application, by determining a basic unit carrying client data, where a rate of the client data is less than a set value determined according to a rate of a carrying container of an OTN frame, and the basic unit is a basic unit contained in a basic unit set; mapping the client data to the basic unit; and sending, through the OTN frame, the basic unit set to which the client data is mapped. Each basic unit in the basic unit set is used as a transmission channel, and the OTN frame is divided into a plurality of sub-pipelines. The number of the sub-pipelines may be determined according to the number of basic units contained in the basic unit set. Therefore, the transmission efficiency of the client data with a rate less than the set value is improved.

Variant embodiments of the above embodiments are provided based on the above embodiments, and merely the differences from the above embodiments are described in the variant embodiments for the sake of brevity.

In an embodiment, the basic unit includes a packet or a cell.

In an embodiment, the basic unit has a fixed length, and consists of a fixed number of bytes or a fixed number of 66-bit code blocks.

The fixed number is not limited herein, and may be determined by those skilled in the art according to the actual situation.

In an embodiment, the basic unit set includes at least one basic unit, and is configured to carry client data for at least one terminal device.

The client data of respective terminal devices may be mapped onto different basic units in the basic unit set to improve a utilization rate of the OTN frame.

In an embodiment, the basic unit includes: overhead information, including one or more of: sequence information for identifying the basic unit; null cell indication information; or operations administration and maintenance information.

The overhead information may be configured to identify the basic units. For example, the sequence information in the overhead information may be a sequence number configured to identify a basic unit in the basic unit set. Idle indication information may be configured to indicate whether a basic unit is an idle basic unit. Idle indication information may be the null cell indication information configured to indicate an idle cell or a service cell. The operations administration and maintenance (OAM) information may be configured for operations, administration and maintenance of the basic unit. For example, the OAM information includes at least one or more of: a local error code, a remote error code, client representation, a latency time, a client type, a local defect, or a remote defect.

In an embodiment, in the case that the basic unit is a cell, the cell is formed by combining different target code blocks including a border control code block and a data code block, the data code block is configured to carry the client data, and the border control code block is configured to identify a border of the cell, and includes at least one or more of: an S block; a T block; an O block; or a predefined control code block.

The predefined control code block may be a custom control code block as long as it can be configured to identify a border of a cell.

In the case where the border control code block includes an S block and a T block, the S block and the T block may be configured to identify start and end of the basic unit, respectively. In the case where the border control code block includes S blocks solely, the S blocks may identify start and end of the basic unit, i.e., may be disposed at a start position and an end position of the basic unit. In the case where the border control code block includes T blocks solely, the T blocks may identify start and end of the basic unit, i.e., may be disposed at a start position and an end position of the basic unit. In the case where merely O blocks are contained, the O blocks may be configured to identify the start and the end of the basic unit, or may be disposed at a start position solely. In the case where merely predefined control code blocks are contained, the predefined control code blocks may be configured to identify the start and the end of the basic unit, or may be disposed at a start position of the basic unit solely.

One or more of the S block, the T block, the O block, or the predefined control code block may be arbitrarily combined to identify a basic unit, which is not limited herein.

In an embodiment, the overhead information in the basic unit is carried on the target code block(s).

The overhead information in the basic unit may be carried on the target code block(s), i.e., may be carried on one or more of: border control code blocks and data code blocks.

In an embodiment, the mapping the client data to the basic unit includes: mapping the client data directly into the basic unit.

For example, in the case that the basic unit is a cell, the client data in the present application may be directly mapped onto data blocks in the cell, and in the case that the basic unit is a packet, the client data in the present application may be mapped onto a content carrying part of the packet.

In an embodiment, the mapping the client data to the basic unit includes: encoding the client data and mapping the encoded data into the basic unit, where the encoding is performed by 64/66 encoding; or by 64/66 encoding and 256/257 encoding.

In the case of encoding the client data in the present application, merely 64/66 encoding may be performed; or firstly 64/66 encoding and then 256/257 encoding are performed.

In an embodiment, the sending, through the OTN frame, the basic unit set to which the client data is mapped includes: mapping the basic unit set to which the client data is mapped into a payload of an optical channel payload unit (OPU), where at least one OPU is provided; and sending the OTN frame carrying the OPU.

In the case of mapping the client data, the client data in the present application may be firstly mapped to payloads of OPUs, and then the OPUs with the mapped client data are sequentially mapped to payloads of the ODUs and the OTUs so that a payload area of the OTN frame carries the client data.

In an embodiment, in the case of at least two OPUs, each OPU is mapped in the same manner, or the OPUs form an OPU multiframe.

In the case of at least two OPUs, each OPU may carry the client data, and the client data at different time points may be carried on different OPUs. Alternatively, the OPUs form a multiframe to carry the client data.

In an embodiment, the basic unit contained in the basic unit set to which the client data is mapped has a fixed mapping location in the OPU; or the basic unit contained in the basic unit set to which the client data is mapped has a floating mapping location in the OPU, and the location in the OPU of each basic unit in the basic unit set is determined by the corresponding border control code block and overhead information.

The basic unit contained in the basic unit set, such as a basic unit carrying client data, has a fixed mapping location in the OPU; or has a floating mapping location. The mapping location of the basic unit in the OPU may be determined by the border control code block and overhead information of the basic unit. The border control code block may be configured to identify a border of the basic unit, and the overhead information may identify a sequence number of the basic unit.

Figure 2:
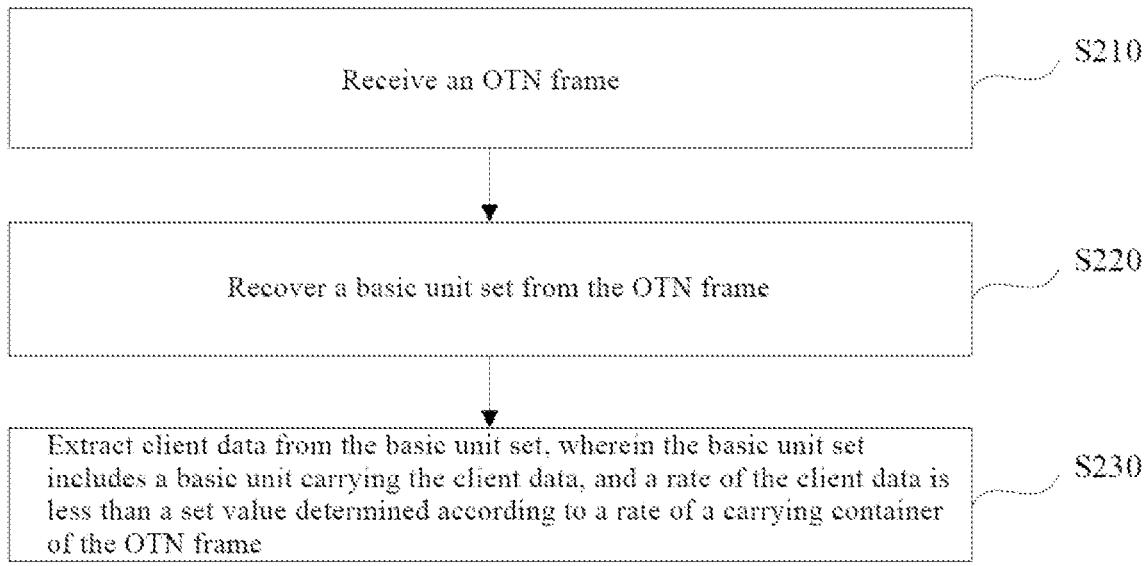
FIG. 2 is a schematic flowchart of another data transmission method provided in the present application.

The present application provides a data transmission method. FIG. 2 is a schematic flowchart of another data transmission method provided in the present application. This method may be applied to the case where client data is received at a terminal device, the client data being carried on a corresponding basic unit and having a rate less than a set value. This method may be executed by the data transmission apparatus provided in the present application. The apparatus may be implemented by software and/or hardware, and integrated on a terminal device. The terminal device may be a device that receives client data.

As shown in FIG. 2, the data transmission method provided in the present application includes: S210, S220, and S230.

S210 includes receiving an optical transport network (OTN) frame.

In the present application, an OTN frame may be firstly received. The OTN carries a basic unit set to which client data is mapped. The client data may be extracted by extracting contents in the OTN frame.

S220 includes recovering a basic unit set from the OTN frame.

In the present application, a corresponding number of basic units may be extracted from the OTN frame based on the number of basic units contained in the basic unit set, so as to recover the basic unit set. Each basic unit in the basic unit set has a corresponding sequence number (i.e., sequence information), based on which the basic unit set can be recovered. For example, the basic units are sequentially arranged according to their sequence numbers to obtain the basic unit set.

S230 includes extracting client data from the basic unit set, where the basic unit set includes a basic unit carrying the client data, and a rate of the client data is less than a set value determined according to a rate of a carrying container of the OTN frame.

After the basic unit set is recovered, the client data may be extracted from the basic unit set according to the present application.

In extraction of the client data, the basic unit carrying the client data may be determined first, then the carried data is extracted from the basic unit, and finally, the client data is obtained according to the sequence number and the carried content of each basic unit. For example, the data of each basic unit is spliced according to the sequence number to obtain the client data.

When the client data is carried on the packet or cell after being encoded, a bit value extracted from the basic unit is decoded to recover the original contents of the client packet, i.e., the client data before encoding.

For details of the present embodiment, reference may be made to the above embodiments, which are not repeated herein.

In the data transmission method provided in the present application, by receiving an OTN frame; recovering a basic unit set from the OTN frame; and extracting client data from the basic unit set, where the basic unit set includes a basic unit carrying the client data, and a rate of the client data is less than a set value determined according to a rate of a carrying container of the OTN frame, the transmission efficiency of the client data with a rate less than the set value is improved.

Variant embodiments of the above embodiments are provided based on the above embodiments, and it should be noted here that merely differences from the above embodiments are described in the variant embodiments for the sake of brevity.

In an embodiment, the recovering the basic unit set from the OTN frame includes: recovering a basic unit set from a payload of an optical channel payload unit (OPU) of the OTN frame, where at least one OPU is provided.

The number of OPUs may be the same as the number of OTN frames, and in the case of at least one OPU, at least one OTN frame may be received in the present application. Then, the basic unit set is recovered from an OPU payload of the at least one OTN frame.

In an embodiment, in the case of at least two OPUs, each OPU is mapped in the same manner, or the OPUs form an OPU multiframe.

In an embodiment, the extracting client data from the basic unit set includes: determining a basic unit carrying client data in the basic unit set; and extracting the client data carried in the basic unit.

In the case of extracting client data, the basic unit carrying the client data in the basic unit set may be firstly determined in the present application. For example, a sequence number, i.e., sequence information, of a basic unit carrying the client data is determined, which sequence information may be determined by the two communication parties in advance. The terminal device sending the basic unit set in the present application may be a transmitting device, and the terminal device receiving the basic unit set to extract the client data may be a receiving device.

After the basic unit is determined, the client data carried on the basic unit may be directly extracted in the present application. At least one basic unit may be determined, and in the case of at least two basic units, the contents carried by the basic units may be spliced according to the sequence numbers of the basic units to obtain the client data.

In the case of extracting client data, the client data in the present application may be client data for one terminal device, and the same technique may be adopted for extracting client data of different terminal devices, which is not limited herein. For example, a basic unit set carries client data 1 of a terminal device a and client data 2 of a terminal device b. The extracting client data in the present application may be considered as a process of extracting client data 1 of the terminal device a or extracting client data 2 of the terminal device b.

In an embodiment, the determining the basic unit carrying client data in the basic unit set includes: determining sequence information of a basic unit carrying client data; and determining the basic unit carrying the client data in the basic unit set based on the sequence information.

In the present application, the sequence information may be extracted from the overhead information of the basic unit, and then the basic unit in the basic unit set corresponding to the sequence information is taken as the basic unit carrying the client data.

In an embodiment, the basic unit set includes at least one basic unit, and is configured to carry client data for at least one terminal device.

In an embodiment, the basic unit includes a packet or a cell.

In an embodiment, the basic unit has a fixed length, and consists of a fixed number of bytes or a fixed number of 66-bit code blocks.

In an embodiment, the basic unit includes: overhead information, including one or more of: sequence information for identifying the basic unit; null cell indication information; or operations administration and maintenance information.

In an embodiment, in the case that the basic unit is a cell, the cell is formed by combining different target code blocks including a border control code block and a data code block, the data code block is configured to carry the client data, and the border control code block is configured to identify a border of the cell, and includes at least one or more of: an S block; a T block; an O block; or a predefined control code block.

In an embodiment, the overhead information in the basic unit is carried on the target code block(s).

In an embodiment, the basic unit contained in the basic unit set has a fixed mapping location in the OPU of the OTN frame; or the basic unit contained in the basic unit set has a floating mapping location in the OPU of the OTN frame, and the location in the OPU of each basic unit in the basic unit set is determined by the corresponding border control code block and overhead information.

The following is an exemplary description of the present application:

The data transmission method provided by the present application may be considered as a method for implementing transmission of fine-grained services in an OTN service, where the fine-grained services may be considered as client services with a rate less than 1.25 G bit/s. The method can realize high-speed and high-quality delivery of fine-grained services.

The data transmission method provided by the present application may include the following operations 1 to 4.

Operation 1 includes: at a transmitting end, determining formats and sequence numbers of basic units carrying a fine-grained service.

Operation 2 includes: at the transmitting end, mapping the fine-grained service to the basic units with corresponding sequence numbers, and mapping all basic units to an OPU payload and sending the same through an OTN frame.

Operation 3 includes: at a receiving end, receiving an OTN frame signal, and recovering the basic units from the corresponding OPU payload.

Operation 4 includes: at the receiving end, extracting information from a payload area of the basic units with corresponding sequence numbers to recover the fine-grained client service.

The operation 1 may include operations 1.1 to 1.4.

At operation 1.1: each basic unit carries sequence numbers as well as overhead bytes. With the sequence numbers, each basic unit is divided into a plurality of sub-basic units that provide sub-transport pipelines. Namely, each basic unit in the basic unit set is numbered with a sequence number, and provides a sub-transport pipeline. The overhead bytes provide information including, but not limited to, OAM information and time information. The overhead information may include sequence numbers and overhead bytes.

At operation 1.2: each basic unit has a fixed length, which may consist of a fixed number of bytes or a fixed number of 66-bit code blocks.

At operation 1.3: when the basic unit consists of 66-bit code blocks, borders of the basic unit are identified with special control code blocks, and data code blocks are used for carrying client data. The special control code blocks may include S blocks, T blocks, O blocks, or many other defined control blocks.

At operation 1.4: bit information of the fine-grained client service may be directly mapped into the basic unit, or contents of the fine-grained client service may be encoded before mapping the encoded result into the basic unit. The encoding may be implemented by 64/66 encoding, or by a combination of 64/66 encoding and 256/257 encoding.

The operation 2 may include operations 2.1 to 2.2.

At operation 2.1: all basic units are mapped into a payload of one OPU according to the sequence numbers, or mapped into payloads of a plurality of OPUs.

At operation 2.2: in mapping of the basic units to the payload of the OPU, fixed location mapping may be performed, where each basic unit has a fixed location in the OTN frame; or floating mapping may also be performed, where each basic unit has a floating location in the OTN frame, and the location of each basic unit is determined by identifying border symbols and a sequence number of the basic unit.

The operation 4 may include operations 4.1 to 4.2.

At operation 4.1: the sequence number carried by each basic unit is determined, and the client data is extracted from the basic unit with a corresponding sequence number.

At operation 4.2: when the client data is mapped onto the basic unit after being encoded, a bit value extracted from the basic unit is decoded to recover the original client data, i.e., the client data before encoding.

Figure 2A:
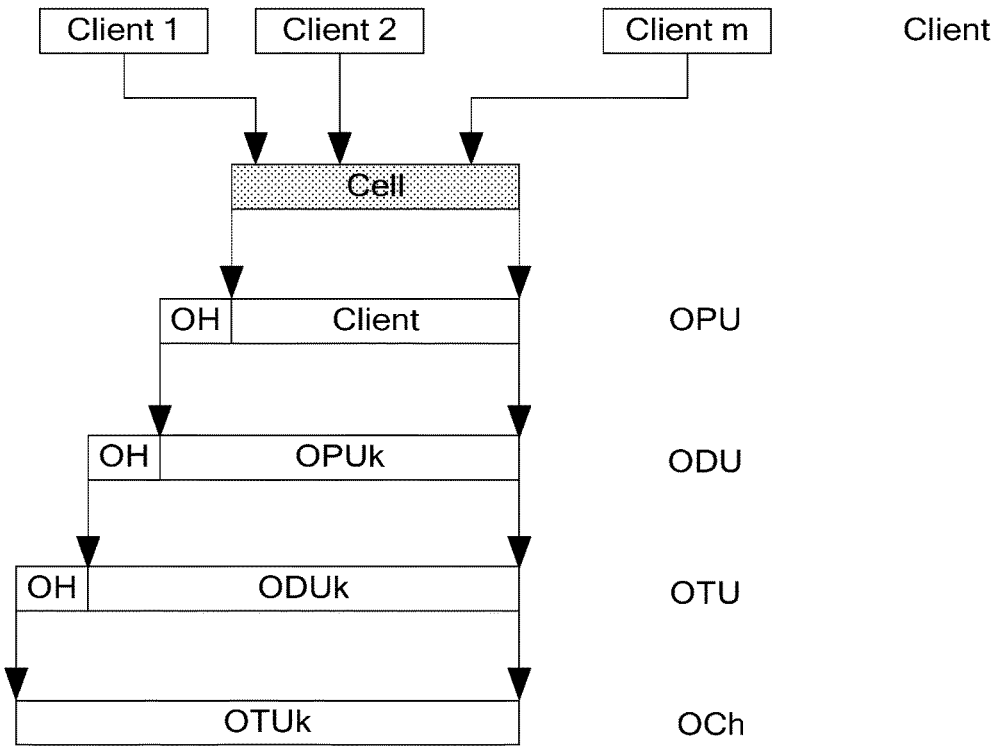
FIG. 2a is a schematic diagram showing a process of delivering client data by means of the OTN technology provided in the present application.

FIG. 2a is a schematic diagram showing a process of delivering client data by means of the OTN technology provided in the present application. Referring to FIG. 2a, assuming that there is a virtual intermediate client, consisting of client 1, client 2, and client 3, with a speed bandwidth of 1.25 G (or 2.5 G or 10 G). The client data of the virtual intermediate client may be carried on a cell.

Figure 2B:
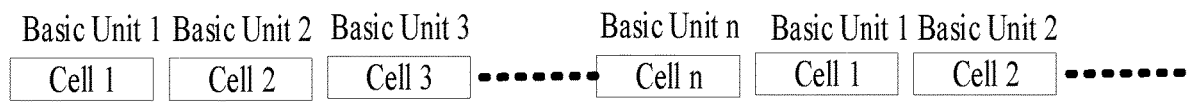
FIG. 2b is a schematic diagram of basic units arranged according to sequence numbers provided in the present application.

FIG. 2b is a schematic diagram of basic units arranged according to sequence numbers provided in the present application. Referring to FIG. 2b, the virtual intermediate client uses fixed-length basic units (hereinafter "cells"), and n basic units form a basic unit set.

Figure 2C:
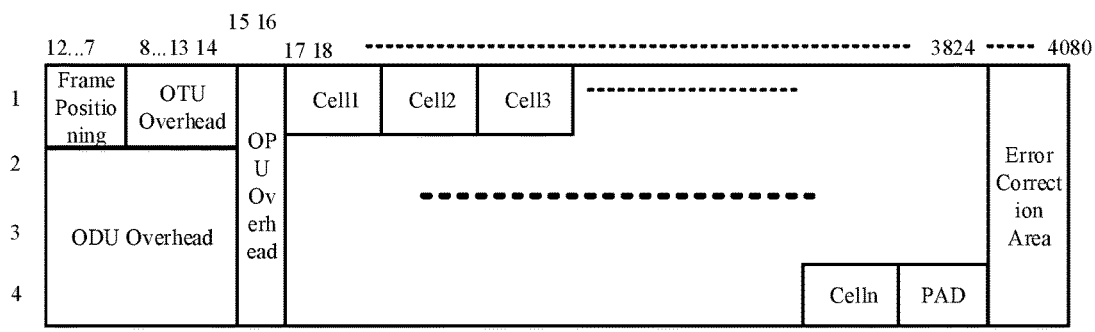
FIG. 2c is a schematic diagram of a process of carrying a basic unit in an OTN frame structure provided in the present application.

FIG. 2c is a schematic diagram of a process of carrying a basic unit in an OTN frame structure provided in the present application. As shown in FIG. 2c, the fixed-length basic units serve as an ODU client defined in the OTN standard, and are carried and transmitted in an OPU container. The fixed-length basic units carry sequence numbers that appear circularly. For example, "1" in cell 1 is the sequence number of the corresponding cell, the sequence number may be cycled every n times, i.e., n cells form a basic unit set. With the sequence numbers, a virtual intermediate client packet is divided into a number of sub-timeslot packets each providing a sub-transport pipeline. For example, the virtual intermediate client corresponds to n cells, then the virtual intermediate client is divided into n sub-timeslot packets by the sequence numbers.

When all intermediate client packets (i.e., data carried by each cell) are of equal length to each other, the virtual intermediate client is divided with the sequence numbers into a plurality of sub-timeslot basic units of the same speed, each sub-timeslot basic unit provides a sub-transport pipeline, and all sub-transport pipelines have identical speeds. The real original client is carried in basic units of the virtual intermediate client, and contents of packets of different original client are placed in basic units with different sequence numbers (i.e., different sub-transport pipelines). For example, the 1st client is placed in basic unit packets of sequence numbers 1, 26, 51 ... n*25+1 (where n is a natural number including 0, 1, 2 or 3, similarly hereinafter). In this way, one of every 25 basic units is selected, and the selected basic units are combined to carry a real client. Therefore, the virtual intermediate client is uniformly divided into 25 equal parts each having a speed being ¹⁄₂₅ of the speed of the virtual intermediate client. When the speed of the virtual intermediate client is 2.5 G, each part has a speed of 100 M so that the intermediate virtual client with a rate of 2.5 G is uniformly divided into 25 parts that form 25 sub-transport pipelines. Each sub-transport pipeline has a bandwidth of 100 M, 25 sub-pipelines of 100 M share one OPU container, each sub-pipeline carries a real client, and the real clients are physically and completely isolated from each other without any interference.

The virtual client packet is in the format of a fixed-length basic unit, all sequential basic units may be carried in one OPU payload area, and when a size of the OPU payload area is an integer multiple of the length of a single basic unit, the OPU payload area can be completely filled with basic units. When the size of the OPU payload area is not an integer multiple of the length of a single basic unit, after the basic units are filled in the OPU payload area, there will be remainder space not enough for one basic unit, into which fixed stuffing bytes, such as PAD bytes may be filled.

Figure 2D:
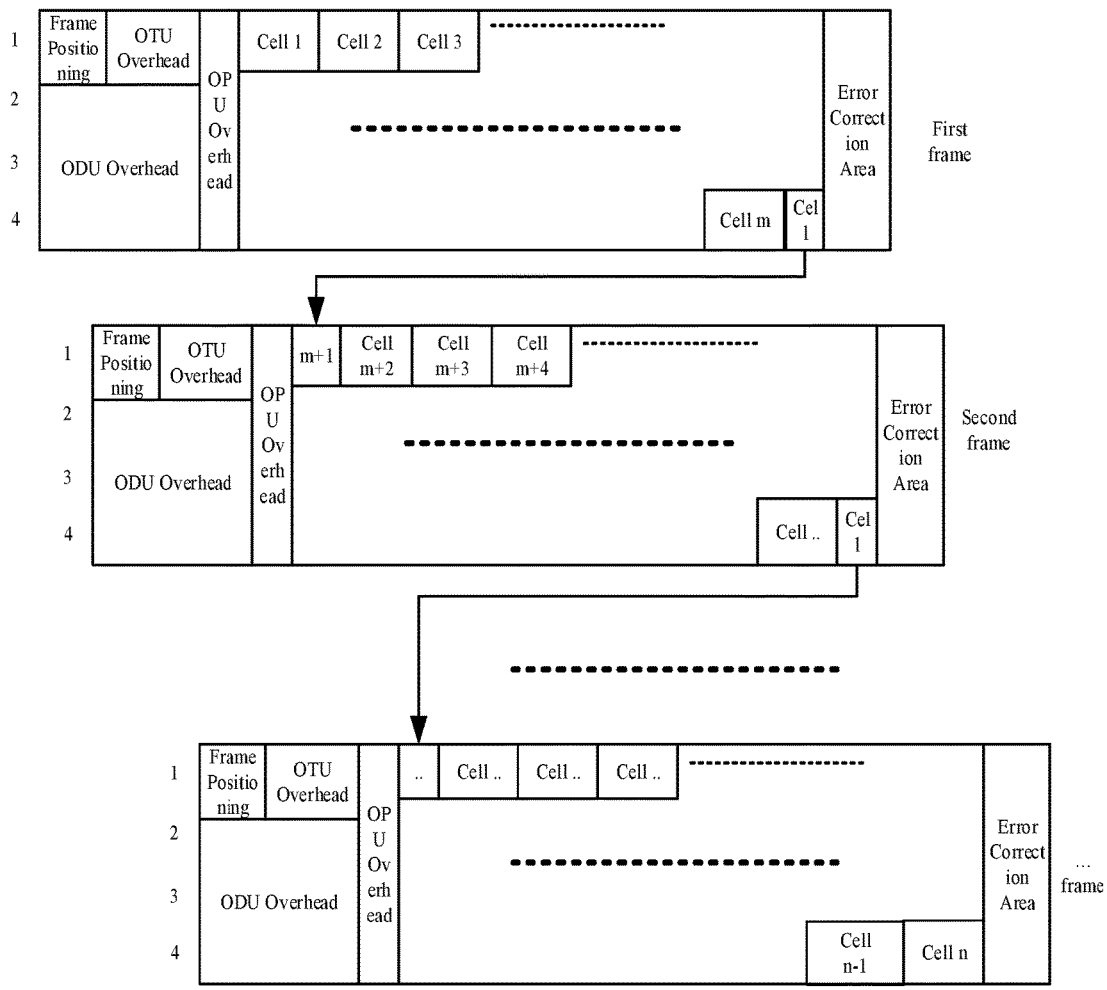
FIG. 2d is a schematic diagram showing a process of basic units carrying by means of multiple OTN frame structures provided in the present application.

FIG. 2d is a schematic diagram showing a process of basic units carrying by means of multiple OTN frame structures provided in the present application. Referring to FIG. 2d, filling the fixed stuffing into the OPU payload may reduce the carrying efficiency, and in an implementation, a plurality of OPU frames may be combined together to form an OPU multiframe. A length of the OPU multiframe is an integral multiple of the length of a single basic unit, and an OPU multiframe can be completely filled with basic units.

The basic units may have fixed locations when being carried in the OPU container, and sequentially arranged in the OPU container according to their sequence numbers. According to the serial numbers, locations of the respective basic units, as well as locations of different clients in the OPU, can be determined. When the client service includes a constant bit rate (CBR) service, the service flow is continuous, without any start or stop time point, and the basic unit may adopt a simplified structure.

Figure 2E:
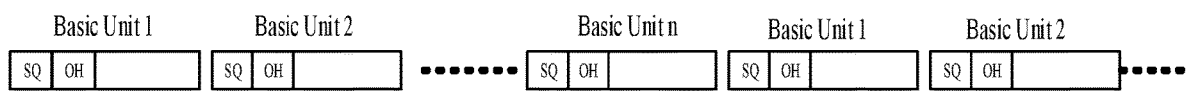
FIG. 2e is a schematic diagram of a basic unit structure provided in the present application.

FIG. 2e is a schematic diagram of a basic unit structure provided in the present application. Referring to FIG. 2e, a basic unit structure consists of a serial number (e.g., a SQ sequence), an overhead byte (e.g., an OH byte), and a payload part of the basic unit. The serial number of each basic unit may be used to determine a sequence number, i.e., sequence information, of the basic unit; the overhead byte is configured to support information such as a basic unit type, OAM or the like, such as information carrying a check value, a sending time, a client signal type, an alarm of the basic unit, or the like; and the payload part of the basic unit is configured to carry client data.

Figure 2F:
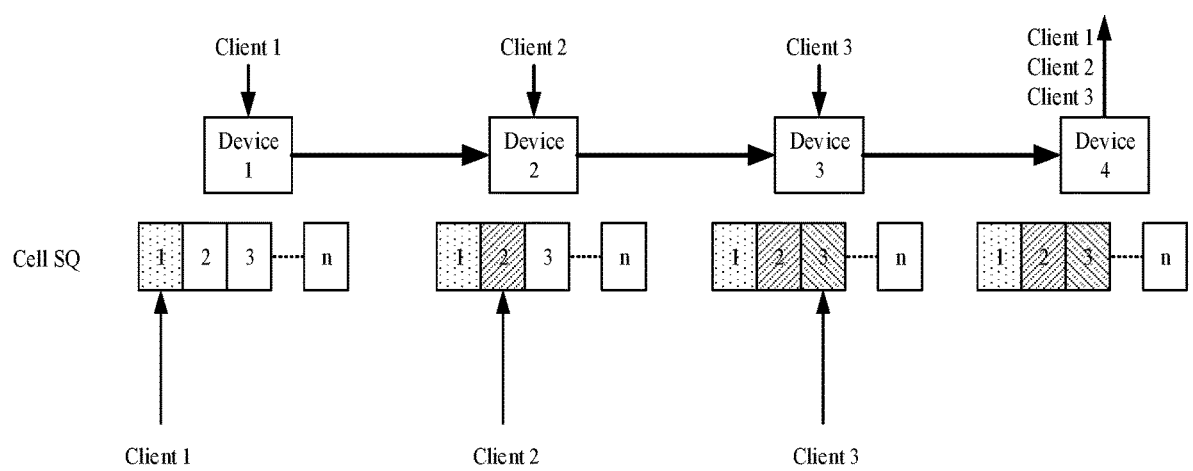
FIG. 2f is a schematic diagram showing a process of a basic unit flow delivering a client service through an OTN network provided in the present application.

FIG. 2f is a schematic diagram showing a process of a basic unit flow delivering a client service through an OTN network provided in the present application. Referring to FIG. 2f, in the figure, four devices form a transmission network through an OTN technology, where an OPU channel between device 1 and device 4 serves as a transport pipeline for fine-grained and low-rate clients, on which transport pipeline a virtual intermediate client is created. The virtual intermediate client includes fixed-length basic units, such as cells, and each basic unit carries a sequence number (such as the cell SQ value in the figure) and other overhead fields. The basic unit packet has a fixed length, and the sequence numbers appears circularly. The basic unit packet is transmitted from the device 1 to the device 4 at a rate of 2.5 G bit/s, and on the intermediate devices 2 and 3, the basic units receive the packet from one direction of the devices and then transmit the packet in the other direction in a crossed manner so that new clients get on and off the device 2 and the device 3. On the device 1, a part of the basic units are selected to carry contents of a client 1, for example, basic units with sequence numbers 1, 26, 51, 76 ... are selected to carry the client 1 with a carrying bandwidth of 100 M bit/s; when the basic units pass through the device 2, a part of the basic units are selected to carry contents of a client 2, for example, basic units with sequence numbers 2, 27, 52, 77 ... are selected to carry the client 2 also with a carrying bandwidth of 100 M bit/s; and similarly, when the basic units pass through the device 3, a part of the basic units are selected to carry contents of a client 3, for example, basic units with sequence numbers 3, 28, 53, 78 ... are selected to carry the client 3. On the device 4, information of the client 1 is extracted and recovered from the basic units with sequence numbers 1, 26, 51, 76 ..., information of the client 2 is extracted and recovered from the basic units with sequence numbers 2, 27, 52, 77 . . . , and information of the client 3 is extracted and recovered from the basic units with sequence numbers 3, 38, 53, 78 . . . . With these basic units, the OPU channel is divided into a plurality of basic unit sub-timeslots each forming a low-rate transport pipeline, and different numbers of basic unit sub-timeslots are combined to form transmission pipelines of different rates. In the present application, different fine-grained and low-rate client will select different basic unit sub-pipelines for carrying, and the fine-grained clients are completely isolated from each other and independently provided without any inference.

When the client service is an Ethernet packet, the client service includes strings of data packets, each packet has a start position and an end position, and a frame interval is present between packets. When the client packet is mapped into the basic units, the start position and the end position of the packet, and frame interval bytes in the packet are marked. In an implementation, the client is typically encoded by 64/66 encoding. The Ethernet standard specifies 64/66 encoding rules, which include converting 64-bit (8 bytes) client information into 66-bit code blocks, in which: the first 2 bits are sync header bits, a sync header value of "01" indicates that the code block includes a data block (D block), and the last 8 bytes (64 bits) are byte contents of the code block. A sync header value of "10" indicates that the code block includes a control block, and content of the first byte (8 bits) after the sync header represents a type value (block type field) of the control block. A control value of "0x1E" (hexadecimal) indicates that the control block includes an idle block, and the content after that in the code block is idle information, such as the encoded result in the second row of the 64/66 encoding rule table, i.e., the C block includes C0, C1, C2, C3, C4, C5, C6, and C7. A control value of "0x78" (hexadecimal) indicates that the control block includes an S block (or an S0 block, which represents a start block of a packet) that represents a start block of a packet, and a preamble (including a frame delimiter) of the client packet is encoded to an S block, such as the encoded result in the third row of the 64/66 encoding rule table, i.e., the S block includes D1, D2, D3, D4, D5, D6 and D7. The S block is followed by contents of the packet, and thus, the S block is followed by the D blocks. The control values 0x87, 0x99, 0xAA, 0xFF, 0xB4, 0xCC, 0xD2, 0xE1, 0xFF indicate that the control block includes 8 T blocks, i.e., T0, T1, T2, T3, T4, T5, T6 and T7. A T block represents an end code block of a data packet. Since the length of the packet is uncertain, after a body part of a packet is encoded into D blocks, the remaining bytes may be less than 8 bytes and cannot be encoded into a D block. Since 0, 1, 2, 3, 4, 5, 6 or 7 bytes may be left, eight T block formats are defined, and different T blocks carry different numbers of data bytes of the remaining bytes of the packet, i.e.: 0, 1, 2, 3, 4, 5, 6 or 7 bytes of the client data.

Figure 2G:
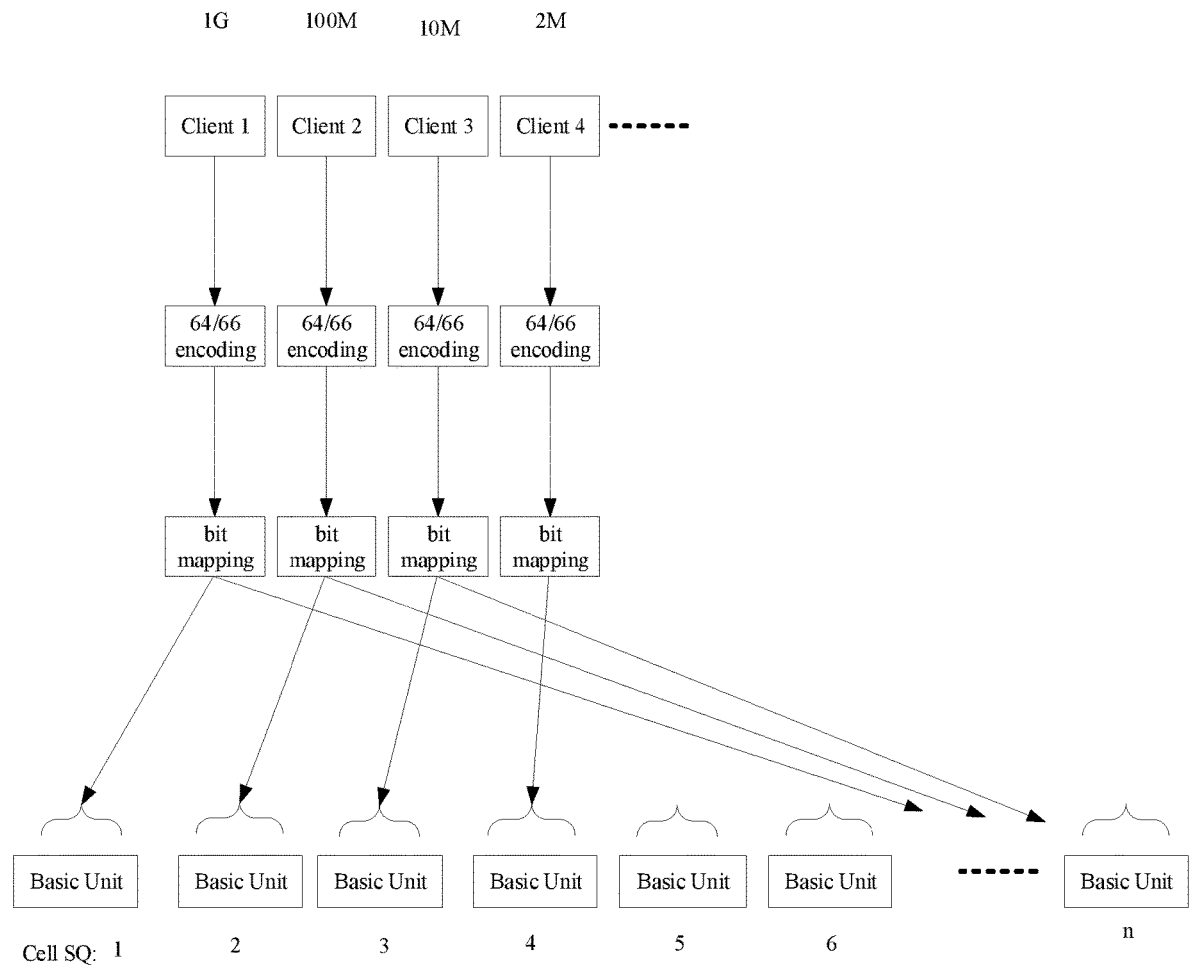
FIG. 2g is a schematic diagram showing a process of mapping an Ethernet packet to basic units through 64/66 encoding provided in the present application.

FIG. 2g is a schematic diagram showing a process of mapping an Ethernet packet to basic units through 64/66 encoding provided in the present application. As shown in FIG. 2g, the original client is encoded by 64/66 encoding before being mapped into the basic units of the virtual intermediate client, and the encoded information is subjected to bit cutting and then placed in the basic units for carrying and transmission, so as to realize bit mapping.

In an example, sequence numbers of the basic units range from 1 to 250, with the same sequence number appearing circularly every 250 basic units. When all basic units are carried and transmitted through one OPU1 container, a total bandwidth of all basic units is 2.5 G bit/s, and for a basic unit with a fixed sequence number value, the physical bandwidth thereof is 10 M bit/s. For a client service with a rate of 100 M, 10 basic units, with a total bandwidth of 100 M bits/s, are selected out of the 250 basic units for carrying and transmission. In order to reduce a latency of the client packet, the basic units are selected at equal intervals in an implementation. For a client service with a rate of 100 M, one of every 25 basic units may be selected to transmit the client information with a rate of 100 M. For example, basic units with sequence numbers 1, 26, 51, 76 . . . are selected to carry the client packet. For a client service with a rate of 10 M, one of every 250 basic units may be selected to transmit the client information with a rate of 10 M.

Because each basic unit itself carries overhead bytes, the client information carried on the basic unit merely occupies a part of the whole basic unit, leading to a bandwidth utilization rate of the carrying pipeline less than 100%, and meanwhile, after 64/66 encoding is carried out on the client packet, the content with a length of 64 bits is increased to 66 bits, causing bandwidth expansion and also reduce the bandwidth utilization rate.

Figure 2H:
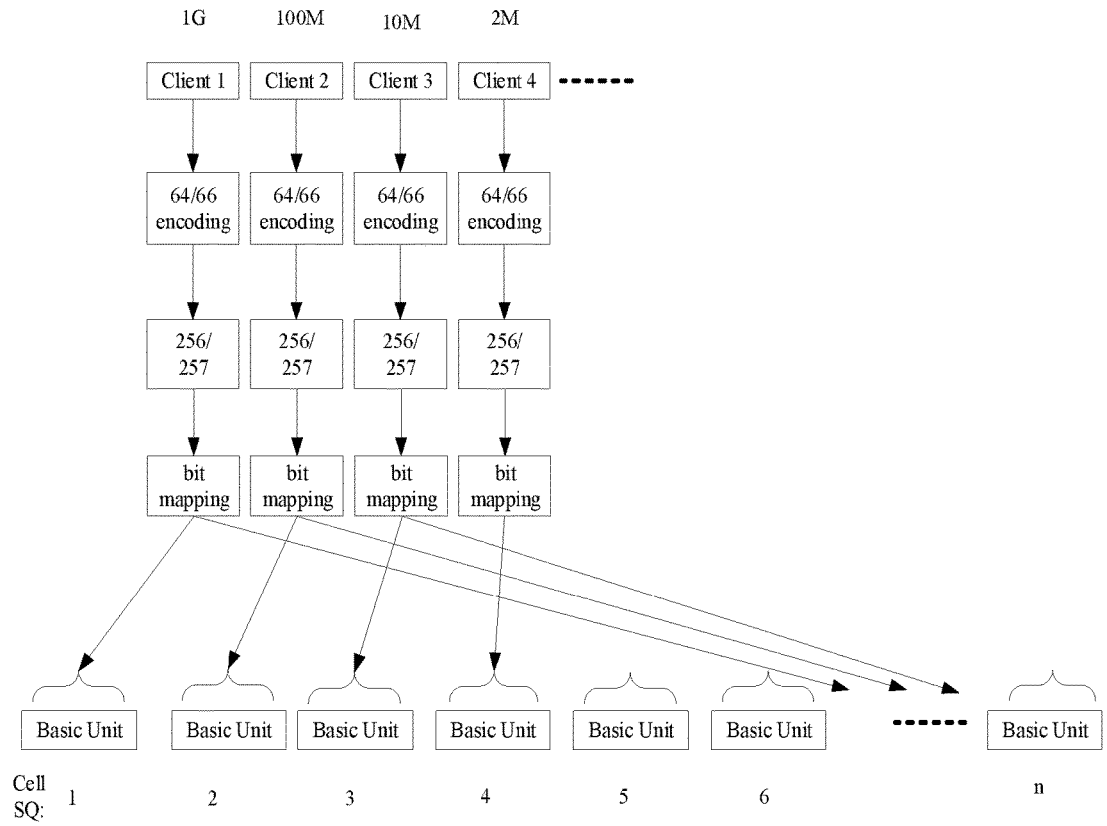
FIG. 2h is a schematic diagram showing a process of mapping an Ethernet packet to basic units through 64/66 encoding and 256/257 encoding provided in the present application.

FIG. 2h is a schematic diagram showing a process of mapping an Ethernet packet to basic units through 64/66 encoding and 256/257 encoding provided in the present application. Referring to FIG. 2h, in order to improve the bandwidth utilization rate, 256/257 encoding may be performed after the 64/66 encoding on the client data. In this way, four 66-bit code blocks may be re-encoded into one 257-bit code block, so that the bandwidth expansion caused by encoding is reduced, and the bandwidth utilization rate is improved. The methods in which the client data is encoded and mapped to the basic units may vary, but are within the protection scope of the present application.

Figure 2I:
FIG. 2i is a schematic diagram of implementing transmission of a fine-grained service using a basic unit consisting of 66-bit blocks provided in the present application.

FIG. 2i is a schematic diagram of implementing transmission of a fine-grained service using a basic unit consisting of 66-bit blocks provided in the present application. Referring to FIG. 2i, a basic unit consists of a serial number, an overhead and a basic unit container, and each part of the basic unit consists of one or more bytes (8-bit data). In practical applications, a basic unit may consist of a plurality of 66-bit blocks, or a basic unit may consist of an S block+D blocks+a T block. The S block is a header block of the basic unit, the T block is a tail block of the basic unit, the D blocks form a carrying part of the basic unit, and the client data is carried on 64 bit data positions of D blocks.

Figures 2J, 2K:
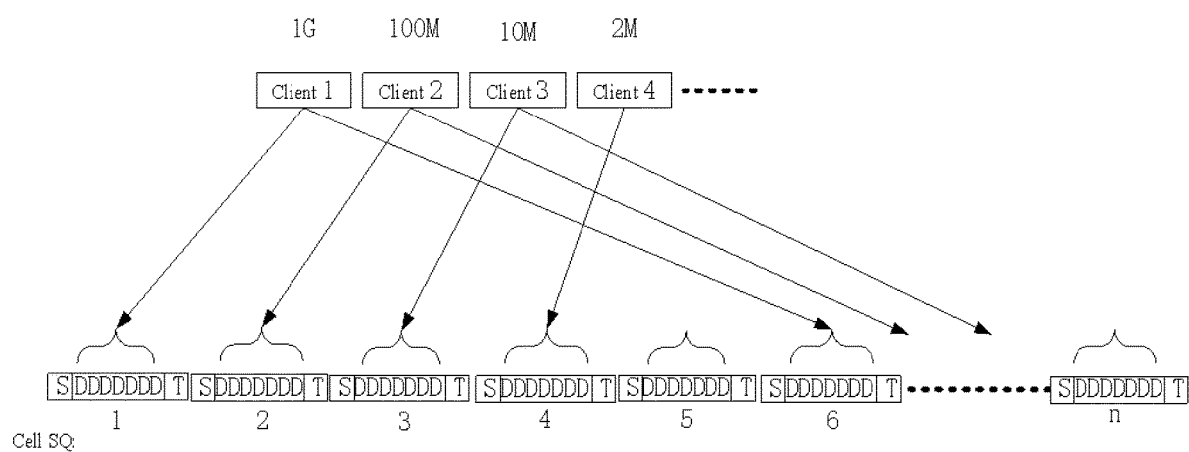
FIG. 2j is a schematic diagram showing a process of mapping a client service to a basic unit consisting of 66-bit blocks provided in the present application.
FIG. 2k is a schematic structural diagram of an S block after an Ethernet packet is encoded by 64/66 encoding provided in the present application.

FIG. 2j is a schematic process diagram of mapping the client service provided by the present application to a basic unit consisting of 66-bit blocks. Referring to FIG. 2j, when the client data includes a consecutive service flow of a CBR type, the client service is directly mapped to 64 bits of the D blocks. When the client service is an Ethernet packet, the client packet is firstly encoded, and then the encoded bit code stream is mapped to 64 bits of the D blocks.

FIG. 2k is a schematic structural diagram of an S block after an Ethernet packet is encoded by 64/66 encoding provided in the present application. Referring to FIG. 2k, in an Ethernet standard, contents of the 7 bytes after the S block are fixed values: 6 bytes are "0x55" (preamble byte contents) and 1 byte is "0xD5" (frame delimiter byte content), forming the 7 bytes of fixed values. In the present application, locations of some of the bytes may be reused to deliver a sequence number and overhead information of a basic unit (e.g., basic unit type indication, OAM information, etc.).

Figure 2L:
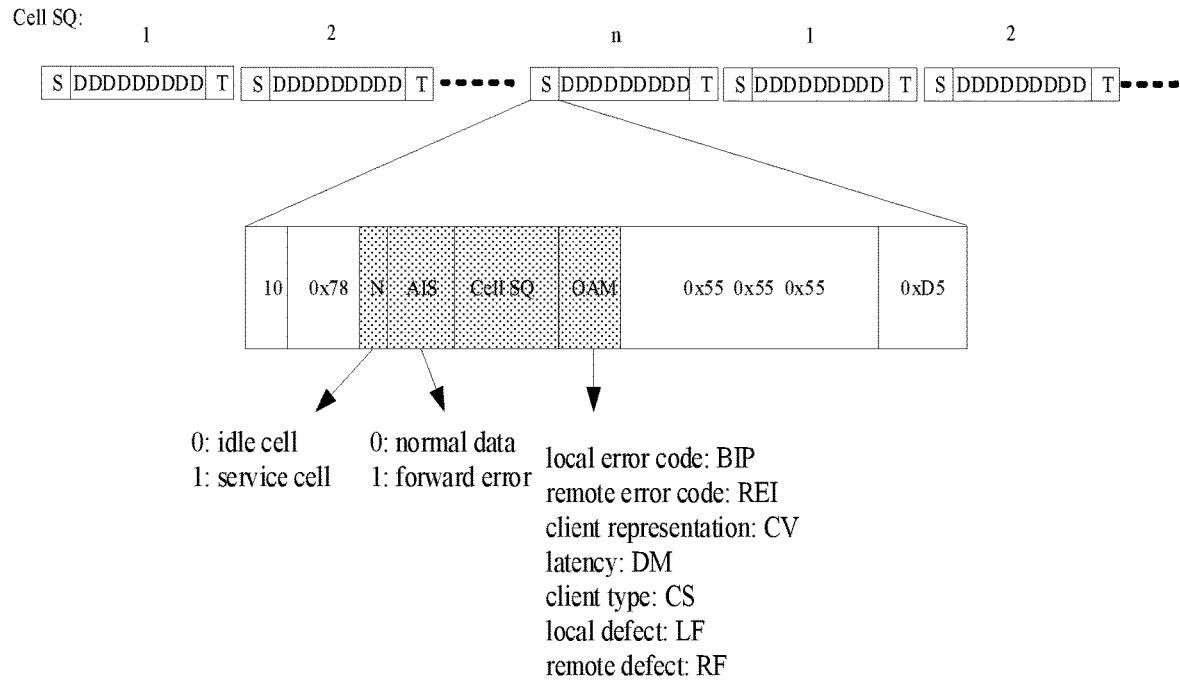
FIG. 2*l* is a schematic structural diagram of an S block carrying overhead information in the basic unit provided in the present application.
Figure 3:
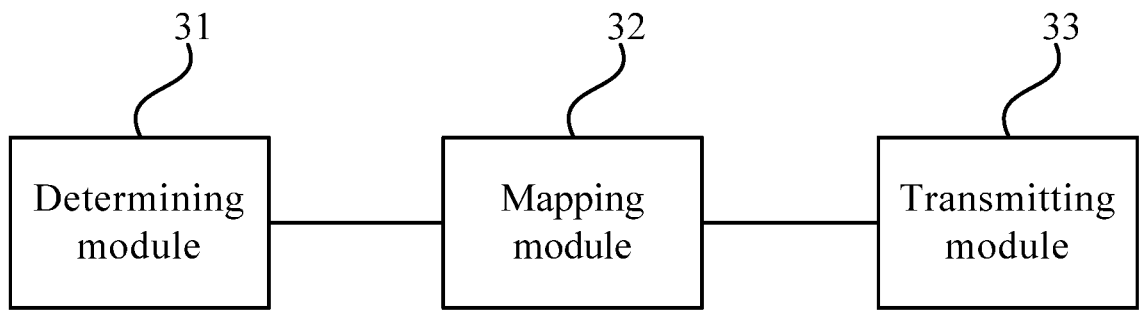
FIG. 3 is a schematic structural diagram of a data transmission apparatus provided in the present application.

FIG. 2l is a schematic structural diagram of an S block carrying overhead information in the basic unit provided in the present application. Referring to FIG. 2l, 3 bytes (24 bits) of each S block are used to deliver a serial number (i.e., a sequence number) and overhead information of a basic unit, and the overhead content of the basic unit has a null basic unit indication signal Null, i.e., N, a basic unit forward error indication signal AIS, and basic unit operations administration and maintenance information OAM. In implementations, the overhead information of the basic unit may include, but is not limited to, the mentioned several types of contents. The overhead information of the basic unit may be placed in the 2nd, 3rd and 4th bytes of the S block, and in practical applications, the overhead information may be placed in other bytes of the S block.

Figure 2M:
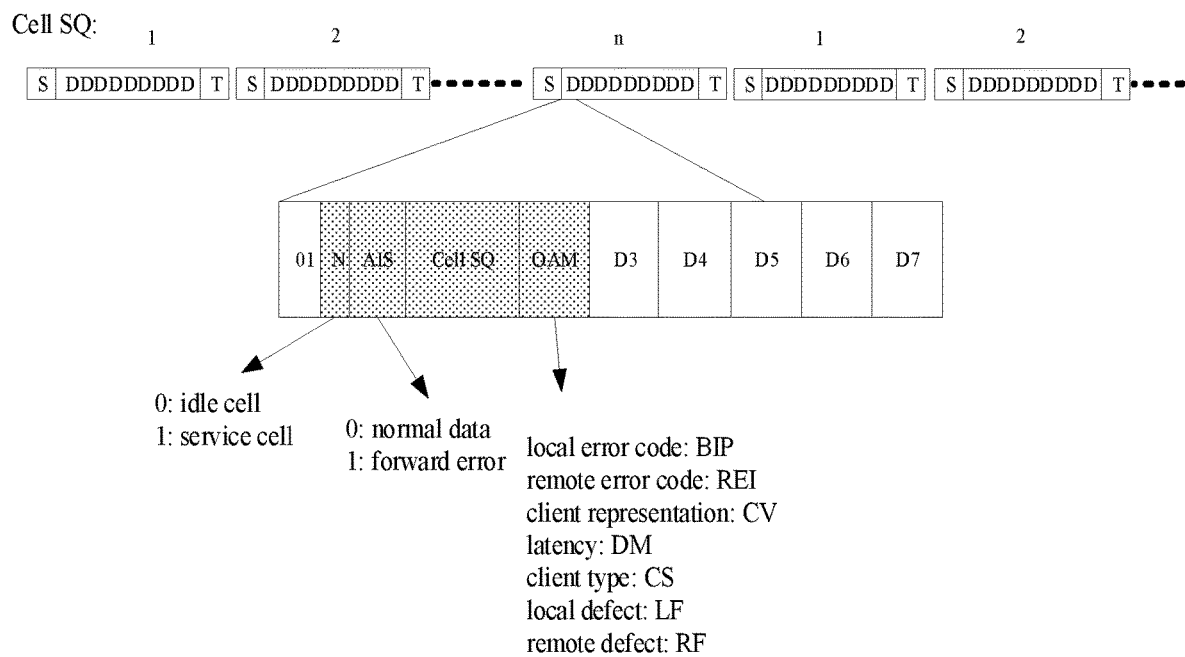
FIG. 2*m* is a schematic structural diagram of overhead information on a D block in a basic unit provided in the present application.

FIG. 2m is a schematic structural diagram of overhead information on a D block in a basic unit provided in the present application. Referring to FIG. 2m, the overhead information may also be placed in a D block after the S block, and carried on a part of the D block. When the overhead information is placed in the first D block, some of the 8 bytes of the first D block carry the overhead information, while some other of the bytes may transfer the overhead information. For example, the first 3 bytes of the first D block are used to carry overhead information, and the last 5 bytes thereof are used to deliver real client data, or the first 6 bytes of the first D block are used to carry real client data, and the last 2 bytes thereof are used to deliver overhead information.

Figure 2N:
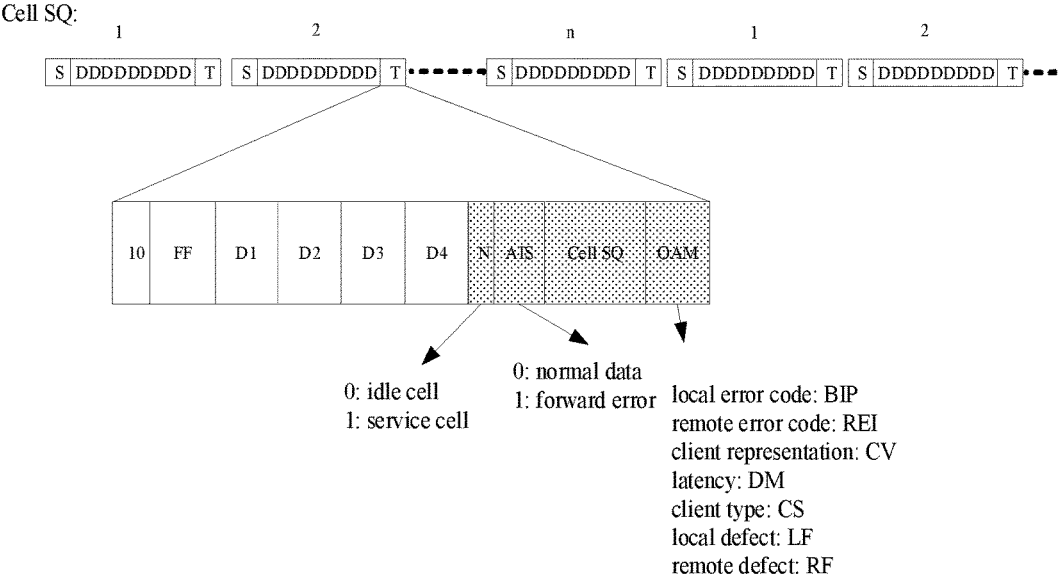
FIG. 2*n* is a schematic structural diagram of overhead information on a T block in a basic unit provided in the present application.

FIG. 2n is a schematic structural diagram of overhead information on a T block in a basic unit provided in the present application. Referring to FIG. 2n, the overhead information may also be placed on the T block, with T7 or another T block as the end block of the basic unit. A part of the bytes of T7 are used to deliver overhead information, and a part of the bytes are used to deliver client information. For example, when the overhead information is placed in three bytes, i.e., the 6th, 7th and 8th bytes of the T block, the 2nd, 3rd, 4th and 5th bytes of the T7 block are used to deliver the client data. In practical applications, the overhead information may be placed in other bytes of the T block. When another control code block is employed as border indication of the basic unit, the overhead information may be placed in border indication code block of the basic unit.

When the basic unit consists of a plurality of 66-bit code blocks, the basic unit code block structure consists of an S block+D blocks+a T block, which is a specific example of the basic unit structure. The basic unit structure may be further reduced to a border code block+a data code block. The border code block is configured to indicate a start position and an end position of a basic unit. The border code block may include two code blocks, one indicating the start position and the other indicating the end position. The border code block may include merely one code block, indicating both an end position of a previous basic unit and a start position of a next basic unit. The data code block is configured to carry client information content. The basic unit may be in various types of formats: for example, instead of using the S block as a basic unit start block and the T block as a basic unit end block, other types of control code blocks may be used as the start block and the end block of the basic unit.

Figure 2O:
FIG. 2*o* is a schematic diagram of basic units consisting of T blocks and D blocks provided in the present application.

FIG. 2o is a schematic diagram of basic units consisting of T blocks and D blocks provided in the present application. Referring to FIG. 2o, two consecutive T blocks may be used as the start block and the end block of the basic unit, where the former T block is the end block of a basic unit, and the later T block is the start block of a basic unit.

Figure 2P:
FIG. 2*p* is a schematic diagram of basic units consisting of O blocks and D blocks provided in the present application.

FIG. 2p is a schematic diagram of basic units consisting of O blocks and D blocks provided in the present application. Referring to FIG. 2p, the basic unit structure may have merely a basic unit border code block without any start block or end block, where the basic unit border code block is an end position of a previous basic unit as well as an end position of a next basic unit, and all data blocks between basic unit border code blocks form a basic unit carrying part. A self-defined control code is used as the basic unit border code block, which may be an O block in the Ethernet-defined encoding. The O block carries self-defined identification content, such as the encoded result in the 4th row of the 64/66 encoding rules (the content of a control word in the O block is "0x4B", O0 in the code block may have various values, and takes a self-defined special value in the present application to be distinguished from the existing value of O0 in the standard).

The present application provides a data transmission apparatus. FIG. 3 is a schematic structural diagram of a data transmission apparatus provided in the present application. The apparatus may be integrated in a terminal device that may be a device configured to transmit client data. As shown in FIG. 3, the apparatus includes: a determining module 31 configured to determine a basic unit carrying client data, wherein a rate of the client data is less than a set value determined according to a rate of a carrying container of an optical transport network (OTN) frame, and the basic unit is a basic unit contained in a basic unit set; a mapping module 32 configured to map the client data to the basic unit; and a transmitting module 33 configured to send, through the OTN frame, the basic unit set to which the client data is mapped.

The data transmission apparatus provided in this embodiment is configured to implement the data transmission method in the embodiment as shown in FIG. 1, and has similar principles and technical effects as the data transmission method in the embodiment as shown in FIG. 1, which are not described in detail herein.

Variant embodiments of the above embodiments are provided based on the above embodiments, and it should be noted here that only the differences from the above embodiments are described in the variant embodiments for the sake of brevity.

In an embodiment, the basic unit includes a packet or a cell.

In an embodiment, the basic unit has a fixed length, and consists of a fixed number of bytes or a fixed number of 66-bit code blocks.

In an embodiment, the basic unit set includes at least one basic unit, and is configured to carry client data for at least one terminal device.

In an embodiment, the basic unit includes: overhead information, including one or more of: sequence information for identifying the basic unit; null cell indication information; or operations administration and maintenance information.

In an embodiment, in the case that the basic unit is a cell, the cell is formed by combining different target code blocks including a border control code block and a data code block, the data code block is configured to carry the client data, and the border control code block is configured to identify a border of the cell, and includes at least one or more of: an S block; a T block; an O block; or a predefined control code block.

In an embodiment, the overhead information in the basic unit is carried on the target code block(s).

In an embodiment, the mapping module 32 is configured to map the client data directly into the basic unit.

In an embodiment, the mapping module 32 is configured to encode the client data and map the encoded data into the basic unit, where the encoding is performed by 64/66 encoding; or by 64/66 encoding and 256/257 encoding.

In an embodiment, the transmitting module 33 is configured to map the basic unit set to which the client data is mapped into a payload of an optical channel payload unit (OPU), where at least one OPU is provided; and send the OTN frame carrying the OPU.

In an embodiment, in the case of at least two OPUs, each OPU is mapped in the same manner, or the OPUs form an OPU multiframe.

In an embodiment, the basic unit contained in the basic unit set to which the client data is mapped has a fixed mapping location in the OPU; or the basic unit contained in the basic unit set to which the client data is mapped has a floating mapping location in the OPU, and the location in the OPU of each basic unit in the basic unit set is determined by the corresponding border control code block and overhead information.

Figure 4:
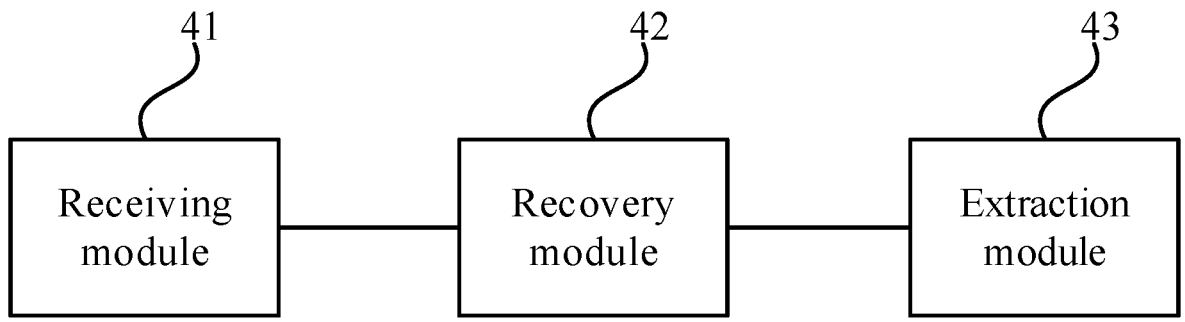
FIG. 4 is a schematic structural diagram of another data transmission apparatus provided in the present application.

The present application provides a data transmission apparatus. FIG. 4 is a schematic structural diagram of another data transmission apparatus provided in the present application. The apparatus may be integrated in a terminal device that may be a device configured to receive client data. As shown in FIG. 4, the apparatus includes: a receiving module 41 configured to receive an optical transport network (OTN) frame; a recovery module 42 configured to recover a basic unit set from the OTN frame; and an extraction module 43 configured to extract client data from the basic unit set, where the basic unit set includes a basic unit carrying the client data, and a rate of the client data is less than a set value determined according to a rate of a carrying container of the OTN frame.

The data transmission apparatus provided in this embodiment is configured to implement the data transmission method in the embodiment as shown in FIG. 2, and has similar principles and technical effects as the data transmission method in the embodiment as shown in FIG. 2, which are not described in detail herein.

Variant embodiments of the above embodiments are provided based on the above embodiments, and it should be noted here that only the differences from the above embodiments are described in the variant embodiments for the sake of brevity.

In an embodiment, the recovery module 42 is configured to recover a basic unit set from a payload of an optical channel payload unit (OPU) of the OTN frame, where at least one OPU is provided.

In an embodiment, in the case of at least two OPUs, each OPU is mapped in the same manner, or the OPUs form an OPU multiframe.

In an embodiment, the extraction module 43 is configured to determine a basic unit carrying client data in the basic unit set; and extract the client data carried in the basic unit.

In an embodiment, the extraction module 43 is configured to determine sequence information of a basic unit carrying client data; and determine the basic unit carrying the client data in the basic unit set based on the sequence information.

In an embodiment, the basic unit set includes at least one basic unit, and is configured to carry client data for at least one terminal device.

In an embodiment, the basic unit includes a packet or a cell.

In an embodiment, the basic unit has a fixed length, and consists of a fixed number of bytes or a fixed number of 66-bit code blocks.

In an embodiment, the basic unit includes: overhead information, including one or more of: sequence information for identifying the basic unit; null cell indication information; or operations administration and maintenance information.

In an embodiment, in the case that the basic unit is a cell, the cell is formed by combining different target code blocks including a border control code block and a data code block, the data code block is configured to carry the client data, and the border control code block is configured to identify a border of the cell, and includes at least one or more of: an S block; a T block; an O block; or a predefined control code block.

In an embodiment, the overhead information in the basic unit is carried on the target code block(s).

In an embodiment, the basic unit contained in the basic unit set has a fixed mapping location in the OPU of the OTN frame; or the basic unit contained in the basic unit set has a floating mapping location in the OPU of the OTN frame, and the location in the OPU of each basic unit in the basic unit set is determined by the corresponding border control code block and overhead information.

Figure 5:
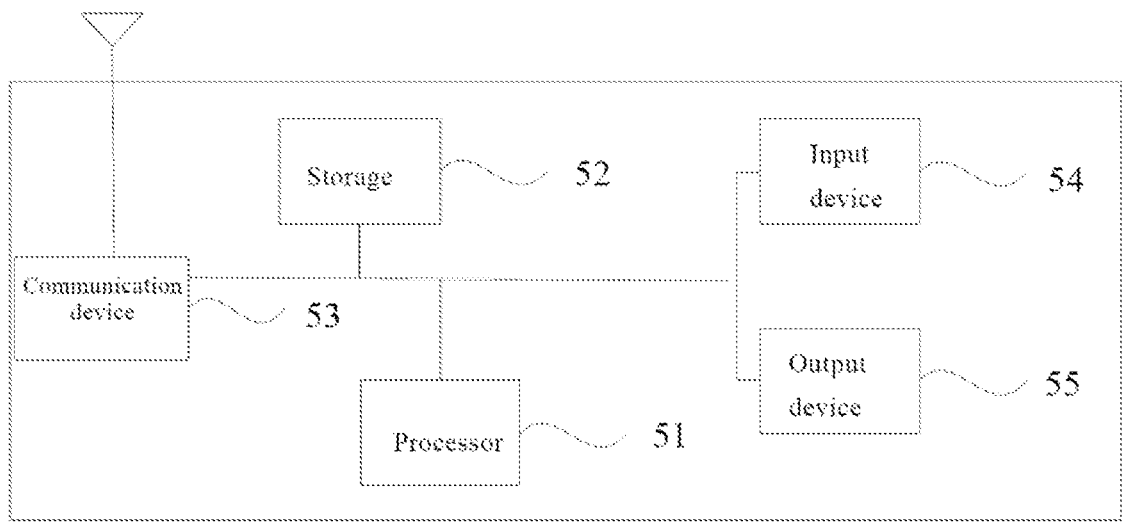
FIG. 5 is a schematic structural diagram of a terminal device provided in the present application.

An embodiment of the present application further provides a terminal device. FIG. 5 is a schematic structural diagram of a terminal device provided in the present application. As shown in FIG. 5, the terminal device provided in the present application includes one or more processors 51 and a storage 52. There may be one or more processors 51 in the terminal device, and the case of one processor 51 is taken as an example in FIG. 5. The storage 52 is configured to store one or more programs which, when executed by the one or more processors 51, cause the one or more processors 51 to implement the method according to any embodiment of the present application.

The terminal device further includes: a communication device 53, an input device 54, and an output device 55.

The processor 51, the storage 52, the communication device 53, the input device 54, and the output device 55 in the terminal device may be connected via a bus or in other manners, and FIG. 5 illustrates the connection by a bus as an example.

The input device 54 may be configured to receive input numeric or character information and generate key signal input related to user settings or function control of the terminal device. The output device 55 may include a display device such as a display screen.

The communication device 53 may include a receiver and a transmitter. The communication device 53 is configured to perform information transceiving communication based on the control by the processor 51. The information includes, but is not limited to, OTN frames.

The storage 52, as a computer-readable storage medium, may be configured to store software programs, computer-executable programs, and modules, such as program instructions/modules (for example, the determining module 31, the mapping module 32 and the transmitting module 33 in the data transmission apparatus, and for another example, the receiving module 41, the recovery module 42, and the extraction module 43 in the data transmission apparatus) corresponding to the method according to any embodiment of the present application. The storage 52 may include a program storage area and a data storage area. The program storage area may store an operating system, or an application program required for at least one function; and the data storage area may store data created according to the use of the terminal device, or the like. Further, the storage 52 may include a high-speed random access memory, and may further include a non-volatile memory, such as at least one magnetic disk memory device, flash memory device, or other non-volatile solid state memory devices. In some examples, the storage 52 may include a memory remotely disposed relative to the processor 51, which memory may be connected to the terminal device via a network. Examples of such networks include, but are not limited to, the Internet, intranets, local area networks, mobile communication networks, and combinations thereof.

An embodiment of the present application further provides a storage medium having a computer program stored thereon which, when executed by a processor, causes the processor to implement the method according to any embodiment of the present application. The data transmission method includes: determining a basic unit carrying client data, where a rate of the client data is less than a set value determined according to a rate of a carrying container of an optical transport network (OTN) frame, and the basic unit is a basic unit contained in a basic unit set; mapping the client data to the basic unit; and sending, through the OTN frame, the basic unit set to which the client data is mapped.

Alternatively, the data transmission method includes: receiving an optical transport network (OTN) frame; recovering a basic unit set from the OTN frame; and extracting client data from the basic unit set, where the basic unit set includes a basic unit carrying the client data, and a rate of the client data is less than a set value determined according to a rate of a carrying container of the OTN frame.

The computer storage medium provided in the embodiments of the present application may include any combination of one or more computer-readable media. The computer-readable medium may be a computer-readable signal medium or a computer-readable storage medium. The computer-readable storage medium may be, for example, but not limited to, an electronic, magnetic, optical, electromagnetic, infrared, or semiconductor system, apparatus, or device, or any combination thereof. Examples (a non-exhaustive list) of the computer-readable storage medium includes: an electrical connection having one or more wires, a portable computer diskette, a hard disc, a random-access memory (RAM), a read-only memory (ROM), an erasable programmable read-only memory (EPROM), a flash, an optical fiber, a portable compact disc read-only memory (CD-ROM), an optical storage device, a magnetic storage device, or any suitable combination thereof. The computer-readable storage medium may be any tangible medium that contains or stores a program to be used by or in connection with an instruction execution system, apparatus, or device.

The computer-readable signal medium may include a data signal carrying a computer-readable program code and propagated in a baseband or as part of a carrier wave. Such propagated data signals may take a variety of forms, including, but not limited to: an electromagnetic signal, an optical signal, or any suitable combination thereof. The computer-readable signal medium may also be any computer-readable medium except a computer-readable storage medium that can communicate, propagate, or transport a program to be used by or in combination with an instruction execution system, apparatus, or device.

The program code embodied on the computer-readable medium may be transmitted through any appropriate medium, including but not limited to: wireless, a wire, a fiber optic cable, a radio frequency (RF), or the like, or any suitable combination thereof.

The computer program code for carrying out operations of the present application may be written in one or more programming languages or a combination thereof, including an object oriented programming language such as Java, Smalltalk, C++, or a conventional procedural programming language, such as the "C" language or any other similar programming language. The program code may be executed entirely or partially on a user computer, as a stand-alone software package, partially on a user computer and partially on a remote computer, or entirely on a remote computer or server. In the latter scenario, the remote computer may be connected to the user computer through any type of network, including a local area network (LAN) or a wide area network (WAN), or may be connected to an external computer (e.g., through the internet via an Internet service provider).

The above are only exemplary embodiments of the present application and not intended to limit the scope of the present application.

The term "terminal device" covers any suitable type of wireless user equipment, such as a mobile phone, a portable data processing device, a portable web browser or a vehicle mobile station.

In general, the various embodiments of the present application may be implemented in hardware or dedicated circuits, software, logic or any combination thereof. For example, some aspects may be implemented in hardware, while other aspects may be implemented in firmware or software which may be executed by a controller, microprocessor or other computing device, although the application is not limited thereto.

Embodiments of the present application may be implemented by a data processor of a mobile device executing computer program instructions, for example in a processor entity, or by hardware, or by a combination of software and hardware. The computer program instructions may be assembler instructions, Instruction Set Architecture (ISA) instructions, machine instructions, machine-related instructions, microcode, firmware instructions, state setting data, or source code or object code written in any combination of one or more programming languages.

The block diagrams of any logic flows in the figures of this application may represent program operations, or may represent interconnected logic circuits, modules, and functions, or may represent a combination of program operations and logic circuits, modules, and functions. The computer program may be stored on a memory. The memory may be of any type suitable to the local technical environment and may be implemented using any suitable data storage technology, such as but not limited to, read-only memories (ROMs), random access memories (RAMs), optical storage devices and systems (digital versatile disks (DVDs), compact discs (CDs)), etc. The computer-readable medium may include a non-transitory storage medium. The data processor may be of any type suitable to the local technical environment, such as but not limited to, general purpose computers, dedicated computers, microprocessors, digital signal processors (DSPs), application specific integrated circuits (ASICs), field-programmable gate arrays (FPGAs), and processors based on a multi-core processor architecture.

What is claimed is:

1. A data transmission method, comprising:
   determining a basic unit carrying client data, wherein a rate of the client data is less than a set value determined according to a rate of a carrying container of an optical transport network (OTN) frame, and the basic unit is a basic unit contained in a basic unit set;
   mapping the client data to the basic unit; and
   sending, through the OTN frame, the basic unit set to which the client data is mapped,
   wherein the basic unit is a cell, the cell is formed by combining different target code blocks comprising a border control code block and a data code block, the data code block is configured to carry the client data, and the border control code block is configured to identify a border of the cell, and comprises at least one of: an S block; a T block; or an O block.

2. The method according to claim 1,
wherein the basic unit has a fixed length, and consists of a fixed number of bytes or a fixed number of 66-bit code blocks; or
wherein the basic unit set comprises at least one basic unit, and is configured to carry client data for at least one terminal device; or
wherein the basic unit comprises overhead information, and the overhead information comprises at least one of: sequence information for identifying the basic unit; null cell indication information; or operations administration and maintenance information.

3. The method according to claim 1, wherein overhead information in the basic unit is carried on at least one of the target code blocks.

4. The method according to claim 1, wherein the mapping the client data to the basic unit comprises one of the following:
mapping the client data directly into the basic unit; or
encoding the client data and mapping the encoded data into the basic unit, wherein the encoding is performed by 64/66 encoding; or by 64/66 encoding and 256/257 encoding.

5. The method according to claim 1, wherein the sending, through the OTN frame, the basic unit set to which the client data is mapped comprises:
mapping the basic unit set to which the client data is mapped into a payload of an optical channel payload unit (OPU), wherein at least one OPU is provided; and
sending the OTN frame carrying the OPU.

6. The method according to claim 5, wherein in a case of at least two OPUs, each OPU is mapped in a same manner, or the OPUs form an OPU multiframe; or
wherein a basic unit contained in the basic unit set to which the client data is mapped has a fixed mapping location in the OPU; or a basic unit contained in the basic unit set to which the client data is mapped has a floating mapping location in the OPU, and a location in the OPU of each basic unit in the basic unit set is determined by a corresponding border control code block and overhead information.

7. A data transmission method, comprising:
receiving an optical transport network (OTN) frame;
recovering a basic unit set from the OTN frame; and
extracting client data from the basic unit set, wherein the basic unit set comprises a basic unit carrying the client data, and a rate of the client data is less than a set value determined according to a rate of a carrying container of the OTN frame,
wherein the basic unit is a cell, the cell is formed by combining different target code blocks comprising a border control code block and a data code block, the data code block is configured to carry the client data, and the border control code block is configured to identify a border of the cell, and comprises at least one of: an S block; a T block; or an O block.

8. The method according to claim 7, wherein the recovering the basic unit set from the OTN frame comprises:
recovering the basic unit set from a payload of an optical channel payload unit (OPU) of the OTN frame, wherein at least one OPU is provided.

9. The method according to claim 8, wherein in a case of at least two OPUs, each OPU is mapped in a same manner, or the OPUs form an OPU multiframe.

10. The method according to claim 7, wherein the extracting the client data from the basic unit set comprises:
determining the basic unit carrying the client data in the basic unit set; and
extracting the client data carried in the basic unit.

11. The method according to claim 10, wherein the determining the basic unit carrying the client data in the basic unit set comprises:
determining sequence information of the basic unit carrying the client data; and
determining the basic unit carrying the client data in the basic unit set based on the sequence information.

12. The method according to claim 7, wherein the basic unit set comprises at least one basic unit, and is configured to carry client data for at least one terminal device.

13. The method according to claim 12,
wherein the basic unit has a fixed length, and consists of a fixed number of bytes or a fixed number of 66-bit code blocks; or
wherein the basic unit comprises overhead information, and the overhead information comprises at least one of: sequence information for identifying the basic unit; null cell indication information; or operations administration and maintenance information.

14. The method according to claim 7, wherein overhead information in the basic unit is carried on at least one of the target code blocks.

15. The method according to claim 7, wherein a basic unit contained in the basic unit set has a fixed mapping location in an OPU of the OTN frame; or a basic unit contained in the basic unit set has a floating mapping location in the OPU of the OTN frame, and a location in the OPU of each basic unit in the basic unit set is determined by a corresponding border control code block and overhead information.

16. A terminal device, comprising:
at least one processor; and
a storage configured to store at least one program; wherein
the at least one program, when executed by the at least one processor, causes the at least one processor to implement the data transmission method according to claim 1.

17. A non-transitory storage medium having a computer program stored thereon which, when executed by a processor, causes the processor to implement the data transmission method according to claim 1.

18. A terminal device, comprising:
at least one processor; and
a storage configured to store at least one program; wherein
the at least one program, when executed by the at least one processor, causes the at least one processor to implement the data transmission method according to claim 7.

* * * * *